(12) United States Patent
Lee et al.

(10) Patent No.: US 10,818,929 B2
(45) Date of Patent: Oct. 27, 2020

(54) ELECTRODE FOR SECONDARY BATTERY HAVING FINE HOLES

(71) Applicant: LG CHEM, LTD., Seoul (KR)

(72) Inventors: Sol Nip Lee, Daejeon (KR); Hyeok Moo Lee, Sejong (KR); Song Taek Oh, Sejong (KR)

(73) Assignee: LG Chem, Ltd. (KR)

( * ) Notice: Subject to any disclaimer, the term of this patent is extended or adjusted under 35 U.S.C. 154(b) by 128 days.

(21) Appl. No.: 15/772,755

(22) PCT Filed: Aug. 21, 2017

(86) PCT No.: PCT/KR2017/009079
§ 371 (c)(1),
(2) Date: May 1, 2018

(87) PCT Pub. No.: WO2018/038479
PCT Pub. Date: Mar. 1, 2018

(65) Prior Publication Data
US 2019/0229341 A1      Jul. 25, 2019

(30) Foreign Application Priority Data

Aug. 25, 2016   (KR) .................. 10-2016-0108048
Aug. 10, 2017   (KR) .................. 10-2017-0101381

(51) Int. Cl.
*H01M 4/66* (2006.01)
*H01M 4/136* (2010.01)
(Continued)

(52) U.S. Cl.
CPC ......... *H01M 4/665* (2013.01); *H01M 4/0404* (2013.01); *H01M 4/0435* (2013.01);
(Continued)

(58) Field of Classification Search
CPC ........ H01M 4/66; H01M 4/136; H01M 4/139; H01M 4/36; H01M 4/04
See application file for complete search history.

(56) References Cited

U.S. PATENT DOCUMENTS

| 6,210,834 | B1 * | 4/2001 | Kweon | .................. | C01G 51/42 |
| | | | | | 429/231.3 |
| 2009/0053607 | A1 * | 2/2009 | Jeong | .................. | H01M 4/1391 |
| | | | | | 429/231.95 |

(Continued)

FOREIGN PATENT DOCUMENTS

| EP | 3 193 392 A1 | 7/2017 |
| JP | 2003-17040 A | 1/2003 |

(Continued)

OTHER PUBLICATIONS

International Search Report for PCT/KR2017/009079 (PCT/ISA/210) dated Dec. 12, 2017.

*Primary Examiner* — Kenneth J Douyette
(74) *Attorney, Agent, or Firm* — Lerner, David, Littenberg, Krumholz & Mentlik, LLP

(57) ABSTRACT

Disclosed herein is an electrode for a secondary battery including an electrode mixture layer including an electrode active material on one surface or both surfaces of a current collector, wherein the electrode mixture layer includes a plurality of fine holes recessed toward the current collector from a vertical cross-sectional surface, and each of the fine holes is a horn-shaped hole whose diameter is gradually decreased from the vertical cross-sectional surface toward the current collector in the electrode mixture layer.

15 Claims, 7 Drawing Sheets

(51) Int. Cl.
*H01M 4/139* (2010.01)
*H01M 4/36* (2006.01)
*H01M 4/13* (2010.01)
*H01M 4/04* (2006.01)
*H01M 10/0525* (2010.01)
*H01M 4/02* (2006.01)
*H01M 4/1393* (2010.01)

(52) U.S. Cl.
CPC ............ *H01M 4/13* (2013.01); *H01M 4/136* (2013.01); *H01M 4/139* (2013.01); *H01M 4/364* (2013.01); *H01M 10/0525* (2013.01); *H01M 4/1393* (2013.01); *H01M 2004/021* (2013.01); *H01M 2004/027* (2013.01); *H01M 2004/028* (2013.01)

(56) References Cited

U.S. PATENT DOCUMENTS

| | | |
|---|---|---|
| 2010/0035152 A1 | 2/2010 | Sastry et al. |
| 2010/0119944 A1* | 5/2010 | Kim .................... H01M 4/0471 429/231.5 |
| 2011/0091754 A1 | 4/2011 | Miyahisa et al. |
| 2013/0040188 A1* | 2/2013 | Zinck .................. H01M 2/1613 429/163 |
| 2016/0013469 A1 | 1/2016 | Tajima et al. |
| 2017/0263933 A1 | 9/2017 | Akikusa et al. |

FOREIGN PATENT DOCUMENTS

| | | |
|---|---|---|
| JP | 2012-190625 A | 10/2012 |
| JP | 5572974 B2 | 8/2014 |
| JP | 2015-82421 A | 4/2015 |
| JP | 2016-58374 A | 4/2016 |
| KR | 10-2014-0142576 A | 12/2014 |
| KR | 10-2015-0051046 A | 5/2015 |
| KR | 10-2015-0082958 A | 7/2015 |
| KR | 10-2016-0024148 A | 3/2016 |
| WO | WO 2016/033379 A1 | 3/2016 |
| WO | WO 2016/039264 A1 | 3/2016 |

* cited by examiner

ELECTRODE FOR SECONDARY BATTERY HAVING FINE HOLES

TECHNICAL FIELD

The present disclosure relates to an electrode for a secondary battery having fine holes.

BACKGROUND ART

Depletion of fossil fuel has brought about a great increase in the price of energy sources and increased interest in environmental pollution. Eco-friendly alternative energy sources are a necessity for the next generation. In this regard, a great deal of research into power production methods such as methods of producing nuclear energy, sunlight power, wind power, and tidal power is underway, and a power storage device for efficiently utilizing the produced energy is also attracting much attention.

Particularly, as mobile devices have been increasingly developed and the demand for such mobile devices has increased, the demand for secondary batteries has also sharply increased as an energy source for the mobile devices. Accordingly, much research into batteries satisfying various needs has been carried out.

In terms of the shape of batteries, the demand for prismatic secondary batteries or pouch-shaped secondary batteries which are thin enough to be applied to products, such as mobile phones, is very high. However, in terms of the material for batteries, the demand for lithium secondary batteries, such as lithium ion batteries and lithium ion polymer batteries, exhibiting high energy density, discharge voltage, and output stability is very high.

Generally, an electrode assembly constituting the secondary battery has a structure in which a positive electrode and a negative electrode are manufactured and a separator is interposed between the positive electrode and the negative electrode by forming an electrode mixture layer including an electrode active material formed on one surface or both surfaces of the electrode assembly.

Recently, by increasing a loading amount of the electrode mixture layer on the current collector, the capacity of the electrode assembly is maximized.

However, in a case of an electrode having a very high loading amount of the electrode mixture layer, a thickness of the electrode mixture layer is excessively large, and thus diffusion of an electrolytic solution does not easily occur in a depth direction of the electrode mixture layer. Also, when compared with an electrode having a low loading amount of the electrode mixture layer, a Li-plating phenomenon in which lithium precipitates at a low SOC frequently occurs.

In particular, as a demand for mobile devices has increased, studies on batteries capable of being rapid charged have been conducted, however, due to the above-mentioned problems, in a case of an electrode having a high loading amount of the electrode mixture layer to maximize the capacity of the electrode, rapid charging may become more difficult.

That is, when increasing the loading amount of the electrode mixture layer formed on the current collector to maximize the capacity of the electrode, diffusion of the electrolytic solution does not easily occur in the depth direction of the electrode mixture layer. And this causes the Li-plating phenomenon, or in the case of a secondary battery including an electrode having a high loading amount of the electrode mixture layer, rapid charging may become more difficult.

Therefore, there is a demand for a technique capable of fundamentally solving the problems.

DISCLOSURE

Technical Problem

The present disclosure is provided to solve the above technical problems of the related art.

The inventors of the present disclosure have conducted intensive research and various experiments and have found that, by including a plurality of horn-shaped fine holes whose diameters are gradually decreased from a vertical cross-sectional surface toward a current collector in an electrode mixture layer, an electrolytic solution may be more easily diffused through the fine holes in a depth direction of the electrode mixture layer, accordingly it is possible to prevent a Li-plating phenomenon from occurring despite a high loading amount of the electrode mixture layer, thereby preventing electrical performance deterioration of an electrode. Additionally, the inventors also found that, in a charging/discharging process, a movement of lithium ions may be smoothed, and thus rapid charging performance is improved, and compared with a conventional method of forming a pattern structure by using a laser, since the fine holes are formed by a mold or a roller including protrusions corresponding to the fine holes, it is possible to prevent the capacity of the electrode from being lowered and it is also possible to eliminate or substantially reduce a defect rate of a product caused by particles separated from the electrode mixture layer by the laser, thereby completing the present disclosure.

Technical Solution

The present disclosure provides an electrode for a secondary battery including an electrode mixture layer including an electrode active material on one surface or both surfaces of a current collector, wherein the electrode mixture layer includes a plurality of fine holes recessed toward the current collector from a vertical cross-sectional surface thereof, and each of the fine holes is a horn-shaped hole whose diameter is gradually decreased from the vertical cross-sectional surface toward the current collector in the electrode mixture layer.

Therefore, an electrolytic solution may be more easily diffused through the fine holes in a depth direction of the electrode mixture layer, and a Li-plating phenomenon may be prevented from occurring despite a high loading amount of the electrode mixture layer, thereby preventing electrical performance deterioration of the electrode. Also, in a charging/discharging process, a movement of lithium ions may be smoothed, and thus rapid charging performance may be improved.

In an exemplary embodiment, the fine holes may be formed in an electrode mixture layer having a loading amount of about 3.5 to 5.5 mAh/cm2 and a porosity of about 25 to 35%.

The ranges of the loading amount and the porosity of the electrode mixture layer are ranges in which the secondary battery including the electrode can exhibit a desired high capacity. Although the electrode for a secondary battery according to the present disclosure has an electrode mixture layer formed to have the above range of the loading amount and the porosity of the electrode mixture layer, unlike a conventional electrode, the electrolytic solution may be more easily diffused in the depth direction of the electrode mixture layer so that a desired effect may be exhibited.

When the loading amount of the electrode mixture layer is excessively small beyond the range or the porosity is excessively large beyond the range, the capacity of the secondary battery including the electrode may not be improved. Conversely, when the loading amount of the electrode mixture layer is excessively large beyond the range or the porosity is excessively small beyond the range, the electrolytic solution may not be easily diffused even though the plurality of the fine holes are formed in the electrode mixture layer.

In addition, a depth of the fine holes formed from a vertical cross-sectional surface toward the current collector may be 80 to 90% of the thickness of the electrode mixture layer corresponding thereto.

When the depth of the find holes is less than 80% of the thickness of the electrode mixture layer corresponding thereto, the depth of the fine holes is excessively low and the electrolytic solution may not be easily diffused in the depth direction of the electrode mixture layer, and thus the desired effect may not be exhibited.

Conversely, when the depth of the find holes is more than 90% of the thickness of the electrode mixture layer corresponding thereto, in a process of pressing the electrode mixture layer using a fine hole forming mold or fine hole forming roller including a protrusion corresponding to the fine hole, an excessively high pressure may be applied to an electrode mixture layer part located at an end part of the fine holes in a current collector direction so that the part may be rolled, the porosity of the electrode mixture layer may become excessively low, and the diffusion of the electrolytic solution may be deteriorated.

Meanwhile, a planar structure of the fine holes is not limited as long as the fine holes are recessed in a horn shape and their diameters are successively decreased from the vertical cross-sectional surface toward the current collector such that a desired effect is exhibited. In particular, the fine holes may be in the shape of a triangle, a quadrangle, a pentagon, a hexagon, a circle, a semicircle, or an ellipse on a plane on a surface part of the electrode mixture layer, and more particularly, the fine holes may be in the shape of a circle in consideration of a uniform diffusion of the electrolytic solution and a uniform delivery of pressure applied in a process of forming the fine holes.

In an exemplary embodiment, the fine holes may have an average diameter of about 100 to 200 micrometers at the vertical cross-sectional surface, and may have an average diameter of about 20 to 50 micrometers at an inner end part thereof.

When the average diameter at the vertical cross-sectional surface is less than 100 micrometers, the diameter of the fine holes at the surface part at which the electrolytic solution starts to flow is too small, and thus the diffusion of the electrolytic solution through the fine holes may be not easily performed. Conversely, when the average diameter at the vertical cross-sectional surface is more than 200 micrometers, the diameter of the fine holes at the surface part becomes excessively large, and thus the capacity of the electrode may be lowered.

In addition, when the average diameter at the inner end part is less than 20 micrometers, a protrusion of the fine hole forming mold or fine hole forming roller on the electrode mixture layer may become too thin so that the fine holes may not be easily formed by a pressure applied to the electrode mixture layer. Conversely, when the average diameter at the inner end part is more than 50 micrometers, the protrusion of the fine hole forming mold or fine hole forming roller on the electrode mixture layer may become too large, and thus the inner end part may be rolled due to the pressure applied to the electrode mixture layer, the porosity at the inner end part of the fine holes of the electrode mixture layer may be lowered, and the diffusion of the electrolytic solution may be deteriorated in the process of forming the fine holes.

In particular, the inner end part of the fine holes may have a circular arc shape in the vertical cross-sectional surface so that the diameter of the inner end part refers to a diameter at a part at which a side edge of the fine hole formed in a linear shape and an end part of the arc shape come into contact with each other among end parts formed in the circular arc shape.

When the inner end part of the fine hole has a needle-shaped structure, a protrusion end part of the fine hole forming mold or fine hole forming roller corresponding thereto must also have a thin needle-shaped structure. Therefore, in the process of pressing by the mold or roller, the protrusion may be deformed, and thus the fine hole may not be easily formed in the electrode mixture layer.

Meanwhile, the plurality of fine holes may have a regular array structure on a plane on a surface part of the electrode mixture layer.

Therefore, the electrolytic solution may be more uniformly diffused to all parts of the electrode mixture layer, and performance deterioration due to a difference in local diffusion of the electrolytic solution may be prevented.

In an exemplary embodiment, the fine hole may have a structure in which its diameter is continuously or discontinuously decreased from the vertical cross-sectional surface toward the current collector, more particularly, may have a structure in which its diameter is gradually decreased due to pressure from the fine hole forming mold or fine hole forming roller so that fine holes may be formed more easily.

Meanwhile, in order to solve a problem of an electrolytic solution diffusion deterioration of a conventional electrode having a high loading amount of the electrode mixture layer, a technique of forming a predetermined pattern on the electrode mixture layer while separating some of the electrode mixture layer from the electrode mixture layer using a laser may be used.

FIG. 1 is a schematic view showing a vertical sectional structure of an electrode in which pattern-shaped fine holes are formed in an electrode mixture layer using a conventional laser, and FIG. 2 is a partial enlarged view schematically showing a structure of part "A" of FIG. 1.

Referring to FIGS. 1 and 2 together, an electrode mixture layer 120 may be formed on an upper surface of a current collector 110.

A plurality of fine holes 130 may be formed in the electrode mixture layer 120 to form a predetermined pattern.

A diameter R1 of each of the fine holes 130 may be substantially uniform from a vertical cross-sectional surface of the electrode mixture layer 120 toward the current collector 110 because the fine holes are formed by separating some of the electrode mixture layer 120 from the electrode mixture layer 120 using the laser.

In particular, when the fine holes 130 are formed using the laser, it may not be easy to control a depth D1 of the fine holes 130. Therefore, the fine holes 130 may be formed to have the depth D1 that is equal to a thickness T1 of the electrode mixture layer 120 to come into contact with an upper surface of the current collector 110.

However, in a technique of forming the fine holes using the laser, the total capacity of the electrode may be decreased because some of the electrode mixture layer is separated in a process of forming the fine holes, and in a process of manufacturing the electrode, separated electrode mixture layer particles may act as impurities that scatter in air and cause defects in a product. Therefore, an additional process or device may be required to prevent defects so that an overall manufacturing cost of the electrode may increase.

In order to solve this problem, the present disclosure provides a device for manufacturing the electrode for a secondary battery. The device includes a fine hole forming mold, and the fine hole forming mold has a structure in which horn-shaped protrusions corresponding to fine holes protrude from one surface thereof so that, when the one surface is pressed against a surface of an electrode mixture layer, horn-shaped fine holes recessed from a surface part of the electrode mixture layer toward a current collector may be formed.

In another exemplary embodiment, the device includes a fine hole forming roller, and the fine hole forming roller has a structure in which horn-shaped protrusions corresponding to fine holes protrude from an outer surface so that, when the outer surface is pressed against a surface of an electrode mixture layer, horn-shaped fine holes recessed from a surface part of the electrode mixture layer toward a current collector may be formed.

That is, the device for manufacturing the electrode for a secondary battery according to the present disclosure may have a structure in which the protrusions protruding from the mold or roller pressurize the electrode mixture layer to form the fine holes.

Therefore, unlike a conventional device for manufacturing an electrode for a secondary battery using a laser, some of the electrode mixture layer may not be separated from the electrode mixture layer, thereby preventing a capacity deterioration of an electrode and effectively preventing a problem of an increase of a product defect rate and an increase of a manufacturing cost that may occur due to the separated electrode mixture layer particles.

In particular, the horn-shaped protrusions may have an average diameter of 100 to 200 micrometers at an end part having a relatively large diameter, and an average diameter of 20 to 50 micrometers at an end part having a relatively small diameter in a vertical cross-sectional surface.

Therefore, by controlling a particle diameter of the fine holes formed by the protrusions within the above range, an electrolytic solution may be easily impregnated in a depth direction of the electrode mixture layer, it is possible to prevent the capacity of the electrode from being lowered, and it is also possible to prevent the electrode mixture layer from being rolled at an inner end part of the fine holes.

The present disclosure provides a method of manufacturing the electrode for a secondary battery. The method includes: coating an electrode mixture slurry including an electrode active material on a current collector; drying and rolling the current collector coated with the electrode mixture slurry to form an electrode mixture layer; and forming a plurality of horn-shaped fine holes recessed into the electrode mixture layer by pressing a mold or a roller against the surface of the electrode mixture layer.

That is, the fine holes of the electrode mixture layer may be formed by pressing the fine hole forming mold or fine hole forming roller after the electrode mixture layer is formed.

In particular, the electrode mixture layer formed in the above process may have a loading amount of about 3.5 to 5.5 mAh/cm2 and a porosity of about 25 to 35%.

In order to maximize the capacity of the electrode, in a structure in which the loading amount of the electrode mixture layer is high, it is possible to prevent the capacity of the electrode mixture layer from being lowered and exhibit an excellent electrolytic solution diffusion effect.

In addition, the mold or roller may include fine hole forming protrusions in a shape corresponding to the horn-shaped fine holes at a part facing the surface of the dried and rolled electrode mixture layer.

Therefore, the fine holes of the electrode mixture layer may be formed by the fine hole forming protrusions formed in the mold or roller when pressure is applied to the surface of the electrode mixture layer by the mold or roller. Thus, unlike the conventional technique in which some of the electrode mixture layer is separated by a laser, it is possible to reduce a defect rate of a product caused by particles separated from the electrode mixture layer and also possible to prevent a manufacturing cost from increasing.

Meanwhile, the diameter of each of the horn-shaped protrusions may be adjusted to a specific range. By controlling the particle diameter of the fine holes formed by the protrusions within the above-range, the electrolytic solution may be easily impregnated in a depth direction of the electrode mixture layer, it is possible to prevent the capacity of the electrode from being lowered, and it is also possible to prevent the electrode mixture layer from being rolled at an inner end part of the fine holes. In particular, each of the horn-shaped protrusions may have an average diameter of about 100 to 200 micrometers at an end part having a relatively large diameter, and an average diameter of about 20 to 50 micrometers at an end part having a relatively small diameter in a vertical cross-sectional surface.

The rest of the configuration of the electrode for a secondary battery and the device for manufacturing the electrode for a secondary battery except for the above-mentioned structure is well known in the art, and thus detailed descriptions thereof will be omitted herein.

Advantageous Effects

As described above, an electrode for a secondary battery according to the present disclosure is configured such that, by a plurality of horn-shaped fine holes whose diameters are successively decreased from a vertical cross-sectional surface toward a current collector being included in an electrode mixture layer, an electrolytic solution can be more easily diffused through the fine holes in a depth direction of the electrode mixture layer, accordingly it is possible to prevent a Li-plating phenomenon from occurring despite a high loading amount of the electrode mixture layer, thereby preventing electrical performance deterioration of an electrode, and, in a charging/discharging process, a movement of lithium ions may be smoothed, and thus rapid charging performance is improved. Also, when compared with a conventional method of forming a pattern structure by using a laser, since the fine holes are formed by a mold or a roller including protrusions corresponding to the fine holes, it is possible to prevent the capacity of the electrode from being lowered and it is also possible to eliminate or substantially reduce a defect rate of a product caused by particles separated from the electrode mixture layer by the laser.

DETAILED DESCRIPTION OF THE PREFERRED EMBODIMENTS

Hereinafter, embodiments of the present disclosure will be described with reference to the accompanying drawings. However, the description provided herein is for better understanding of the present disclosure, and the scope of the present disclosure is not limited thereto.

Figure 1:
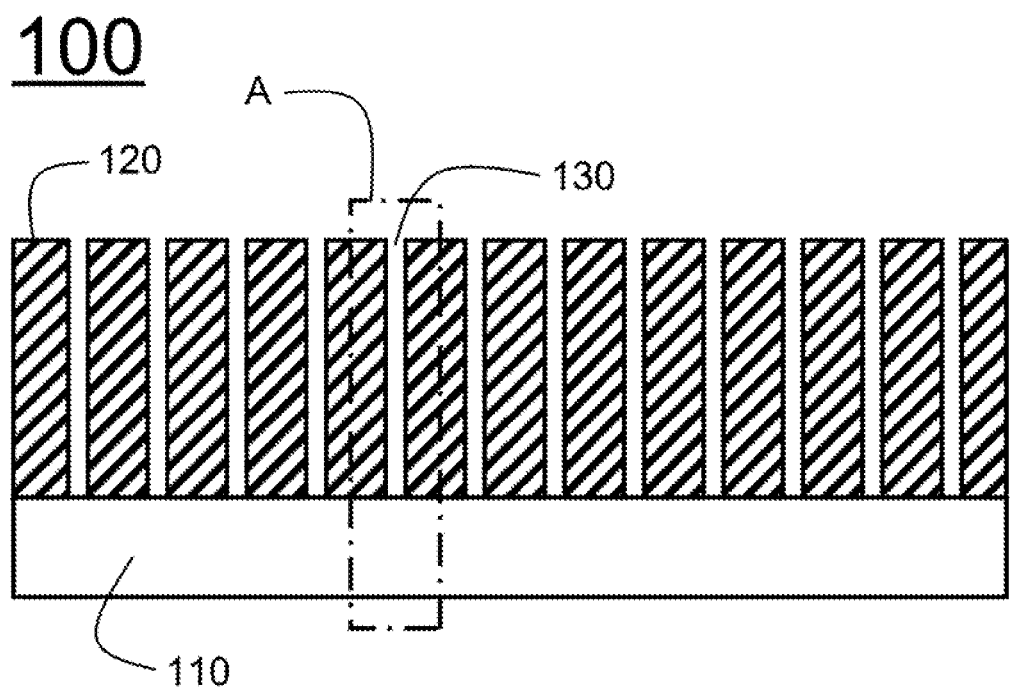
FIG. 1 is a schematic view showing a vertical cross-sectional structure of an electrode in which pattern-shaped fine holes are formed in an electrode mixture layer using a conventional laser.
Figure 2:
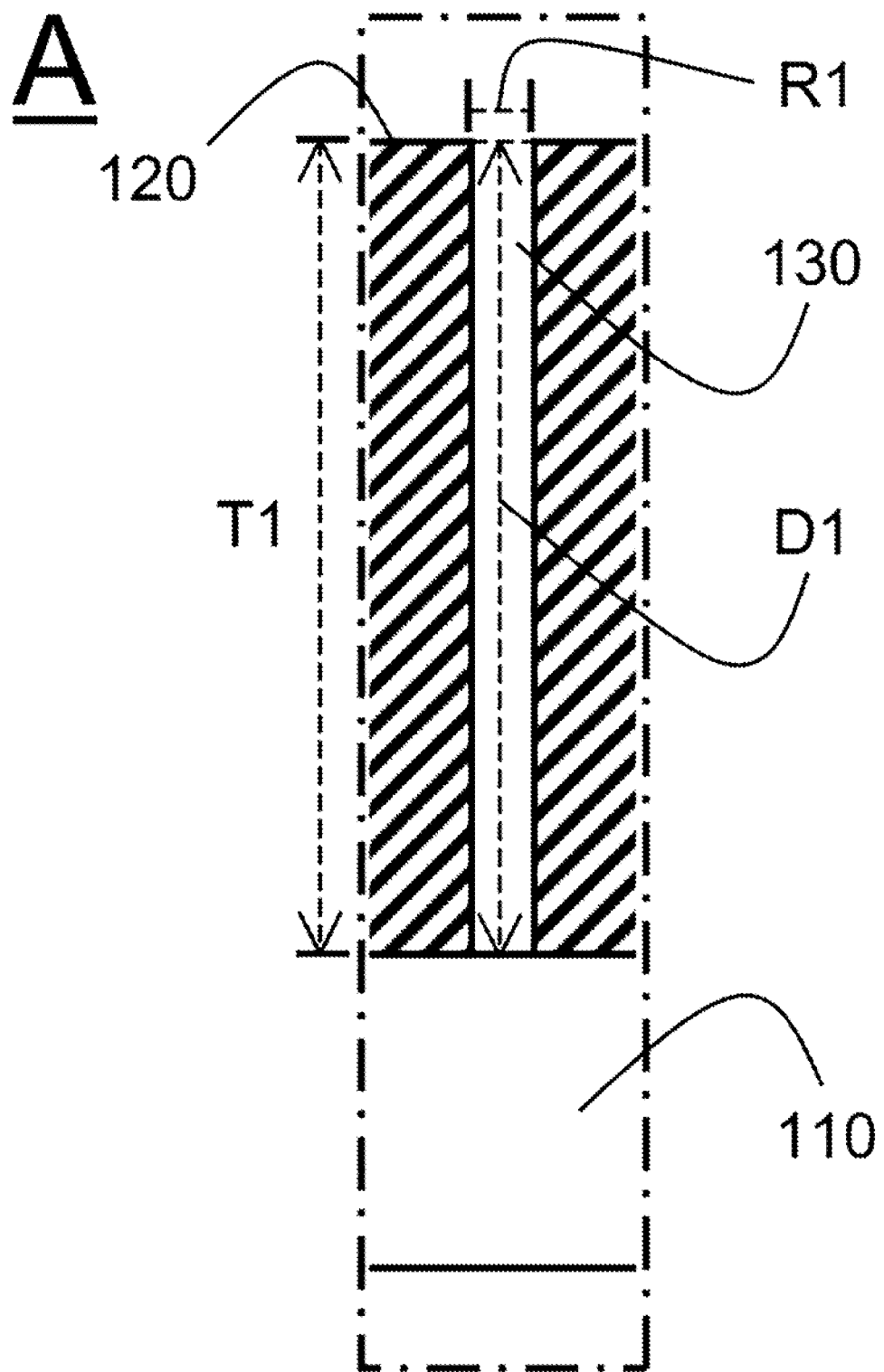
FIG. 2 is a partial enlarged view schematically showing a structure of part "A" of FIG.
Figure 3:
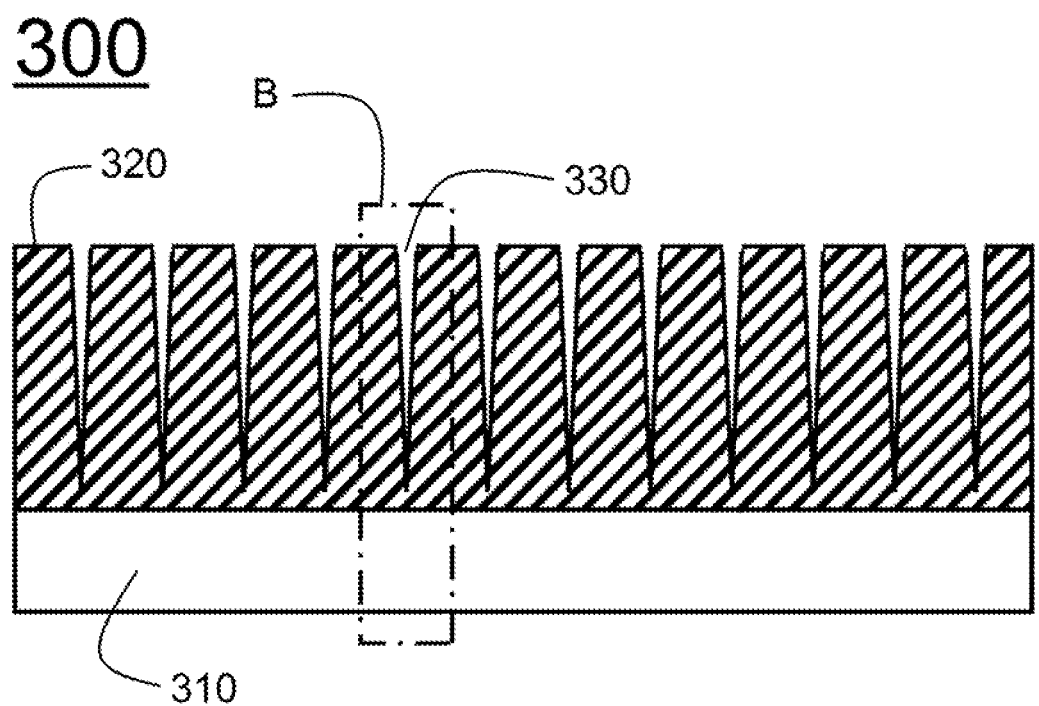
FIG. 3 is a schematic view showing a vertical cross-sectional structure of an electrode for a secondary battery according to an exemplary embodiment of the present disclosure.
Figure 4:
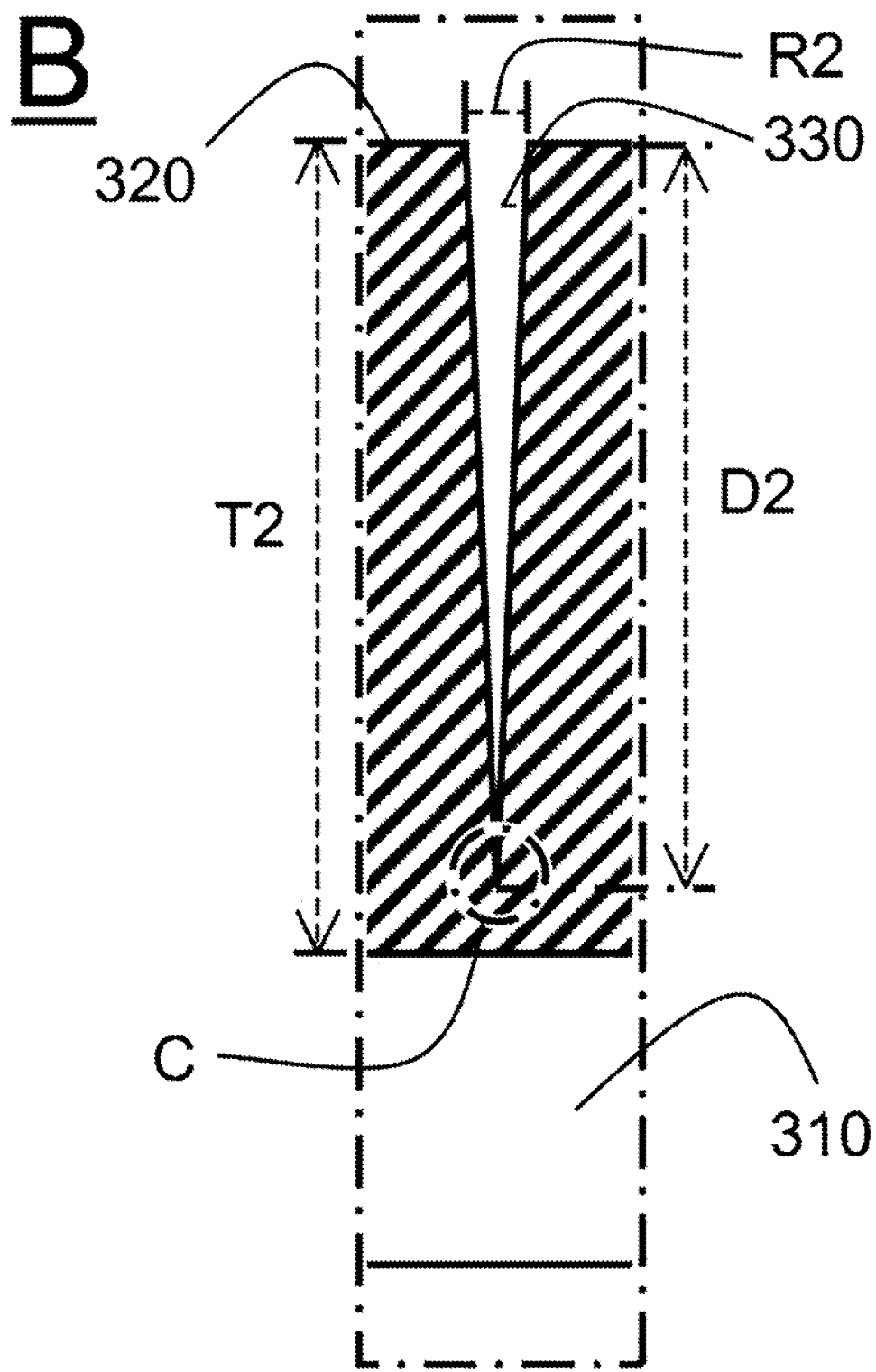
FIG. 4 is a partial enlarged view schematically showing a structure of part "B" of FIG. 3.
Figure 5:
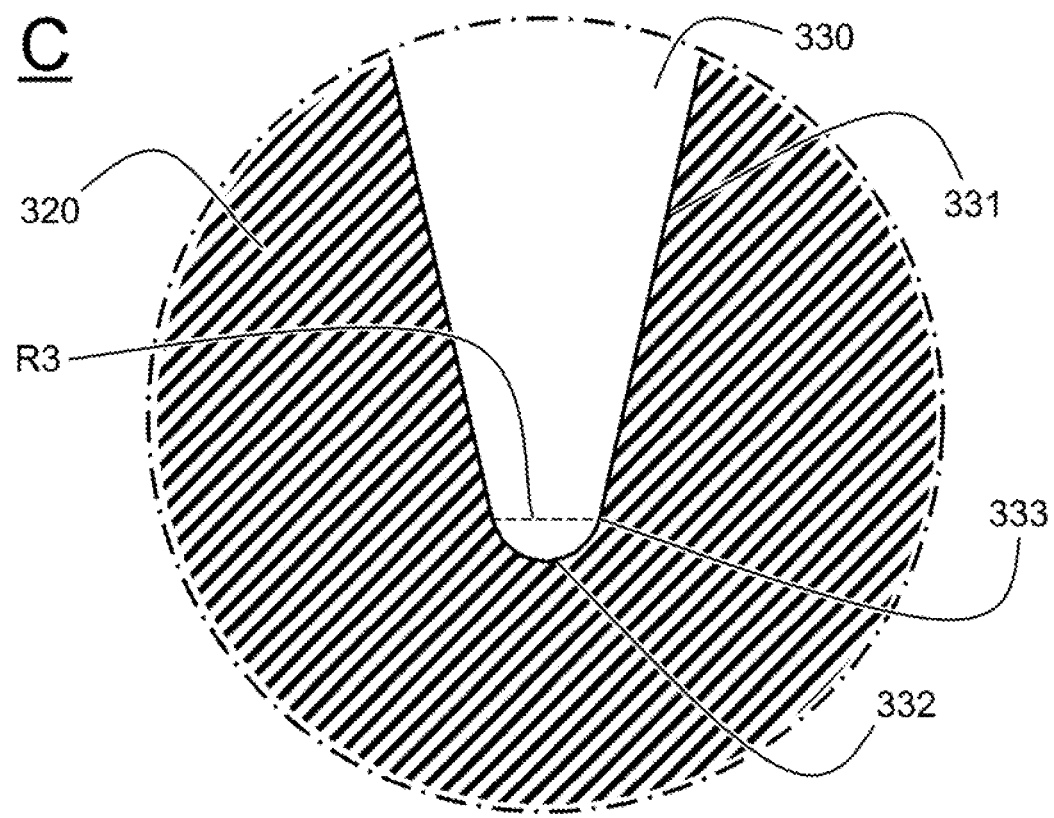
FIG. 5 is a partial enlarged view schematically showing a structure of part "C" of FIG. 4.

FIG. 3 is a schematic view showing a vertical cross-sectional structure of an electrode for a secondary battery according to an exemplary embodiment of the present disclosure, FIG. 4 is a partial enlarged view schematically showing a structure of part "B" of FIG. 3, and FIG. 5 is a partial enlarged view schematically showing a structure of part "C" of FIG. 4.

Referring to FIGS. 3 to 5 together, an electrode mixture layer 320 is formed on an upper surface of a current collector 310.

The electrode mixture layer 320 has a structure in which a plurality of fine holes 330 are regularly arranged.

The fine holes 330 are recessed from a vertical cross-sectional surface toward the current collector 310 and have a horn shape in which diameters R2 and R3 are gradually decreased toward the current collector.

A depth D2 of the fine hole 330 formed from a surface part thereof toward the current collector 310 may have a size of about 90% of a thickness T2 of the electrode mixture layer 320 corresponding thereto.

The fine hole 330 may have an average diameter R2 of 100 to 200 micrometers at the surface part thereof and an average diameter R3 of 20 to 50 micrometers at an inner end part 332 thereof.

The fine hole 330 may have the arc-shaped inner end part 332 on a vertical section thereof and accordingly, the average diameter R3 at the inner end part 332 may be the average diameter R3 at a part 333 at which a side edge 331 of the fine hole 330 formed in a straight line and the arc-shaped inner end part 332 come into contact with each other.

Figure 6:
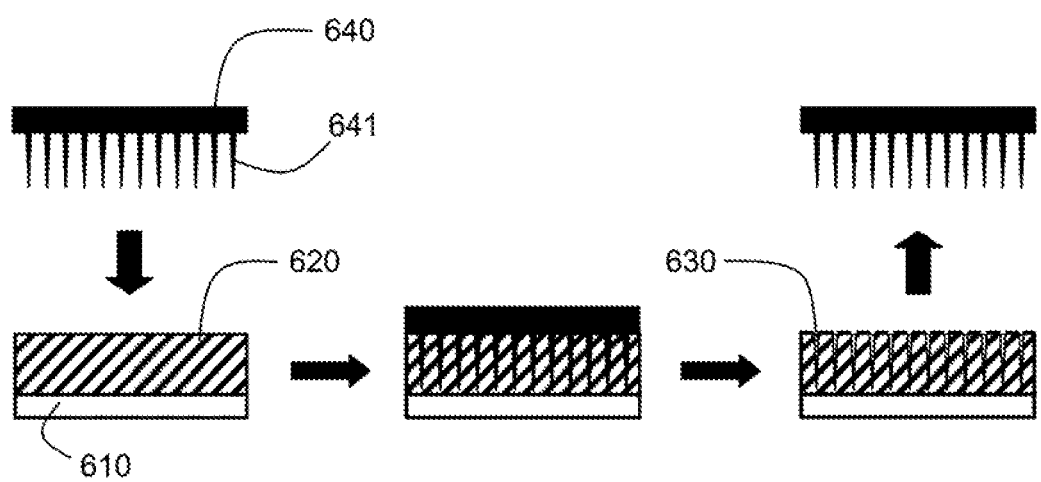
FIGS. 6 and 7 are schematic views showing a process of forming a fine hole in an electrode mixture layer using a device for manufacturing an electrode for a secondary battery according to another exemplary embodiment of the present disclosure.
Figure 7:
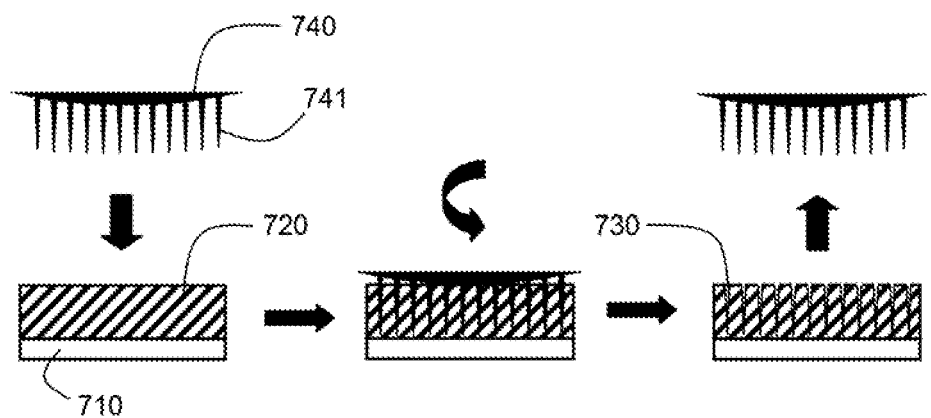

FIGS. 6 and 7 are schematic views showing a process of forming fine holes in an electrode mixture layer using a device for manufacturing an electrode for a secondary battery according to another exemplary embodiment of the present disclosure.

Referring to FIG. 6, the device for manufacturing an electrode for a secondary battery may include a fine hole forming mold 640.

The fine hole forming mold 640 may have horn-shaped protrusions 641 corresponding to fine holes 630 on one surface thereof facing a surface of an electrode mixture layer 620.

Therefore, the one surface of the fine hole forming mold 640 may be pressed against the surface of the electrode mixture layer 620 so that the horn-shaped fine holes 630 that are recessed toward a current collector 610 from the surface of the electrode mixture layer 620 may be easily formed.

After the fine holes 630 are formed in the electrode mixture layer 620, the fine hole forming mold 640 may be separated from the electrode mixture layer 620.

Referring to FIG. 7, the device for manufacturing an electrode for a secondary battery may include a fine hole forming roller 740.

The fine hole forming roller 740 may have horn-shaped protrusions 741 corresponding to fine holes 730 on an outer surface thereof facing a surface of an electrode mixture layer 720.

Therefore, the outer surface of the fine hole forming roller 740 may be rotated and pressed against the surface of the electrode mixture layer 720 so that the horn-shaped fine holes 730 that are recessed toward a current collector from the surface of the electrode mixture layer 720 may be easily formed.

After the fine holes 730 are formed in the electrode mixture layer 720, the fine hole forming roller 740 may be separated from the electrode mixture layer 720.

Hereinafter, the present disclosure will be described in detail with reference to the following examples. However, the examples provided herein are for illustrating the present disclosure, and the scope of the present disclosure is not limited thereto.

Example 1

Artificial graphite, carbon black, CMC, and SBR were mixed with distilled water at a weight ratio of 95.8:1:1.2:2 to prepare a negative electrode slurry. The negative electrode slurry was coated on a copper foil to form a thin electrode plate, dried at 135° C. for 3 hours or more, and rolled to prepare a negative electrode mixture. A loading amount of the negative electrode mixture was 4.5 mAh/cm2, and a volume of pores having a pore diameter of about 0.5 to 3 μm was 30%. As shown in FIG. 5, a fine hole forming mold in which horn-shaped protrusions were formed was pressed against a surface of a negative electrode mixture layer to form a plurality of fine holes recessed in the horn-shape in the negative electrode mixture layer. In particular, a diameter of each of the fine holes was 200 micrometers at a surface part thereof and 35 micrometers at an inner end part thereof.

For a positive electrode, $Li(Ni_{1/3}Co_{1/3}Mn_{1/3})O_2$ was used as a positive electrode active material, which was mixed with carbon black and PVDF in distilled water at a ratio of 96:2:2 to prepare a positive electrode slurry. The positive electrode slurry was coated on an aluminum foil to form a thin electrode plate, dried at 135° C. for 3 hours or more, and rolled to prepare the positive electrode.

An electrolytic solution was prepared by mixing ethylene carbonate and ethyl methyl carbonate at a volume ratio of 3:7 vol %, and $LiPF_6$ was added thereto at a concentration of 1.0M. Further, vinylene carbonate, propane sultone, and ethylene sulfate were each added at 0.2 wt % with respect to the total amount of the electrolytic solution.

A battery was manufactured using the negative electrode, positive electrode, and electrolyte solution manufactured above. As a separator, celgard2320 was used.

Example 2

A battery was manufactured in the same manner as in Example 1 except that the loading amount of the negative electrode was changed to 3.7 mAh/cm2 and the porosity was changed to 34%.

Example 3

A battery was manufactured in the same manner as in Example 1 except that the loading amount of the negative electrode was changed to 5.3 mAh/cm2 and the porosity was changed to 27%.

Comparative Example

A secondary battery was manufactured in the same manner as in Example 1 except that a negative electrode manufactured by omitting a process of forming a fine hole in a negative electrode mixture layer in the above example was used.

Lithium Plating Suppression Effect

Figure 8:
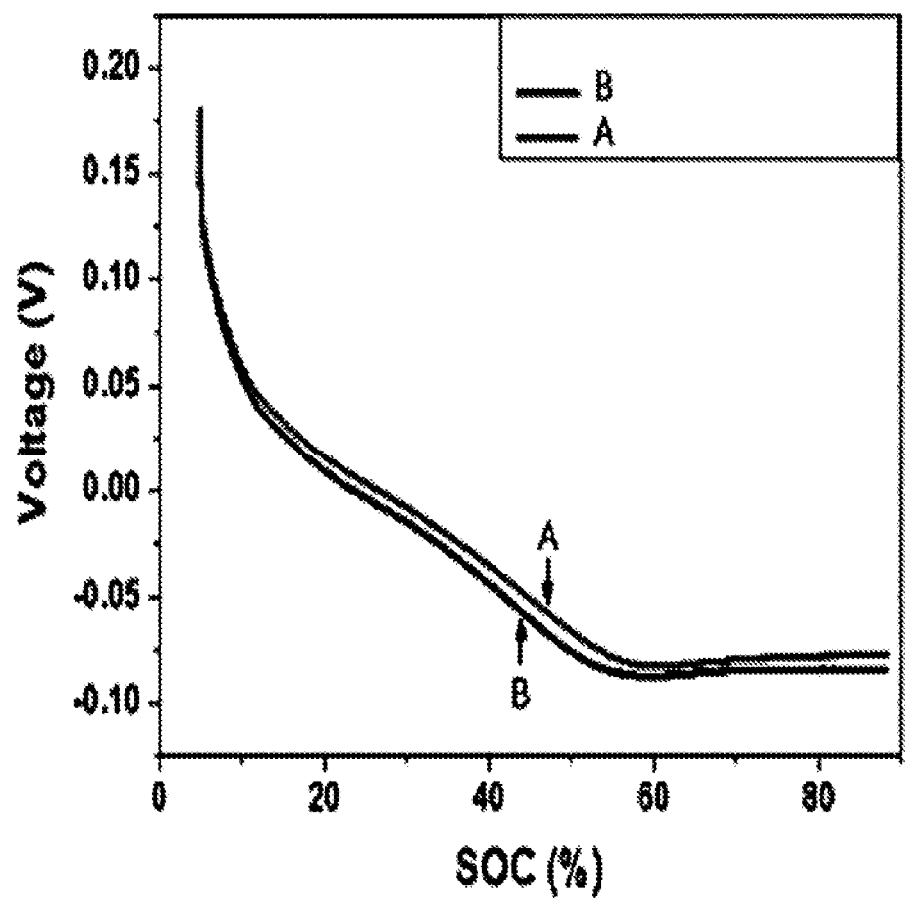
FIG. 8 is a graph showing negative electrode profiles of batteries of Example 1 and Comparative example.

FIG. 8 is an analysis result of negative electrode profiles of the batteries of Example 1 and Comparative example. The negative electrode profile was obtained by separately extracting the negative electrode profile (1.5 C charge) at a time of charging through a three-electrode system and then differentiating a graph represented by a potential value with respect to SOC. In FIG. 8, A is a point at which a slope of the battery of Example 1 changed and B is a point at which a slope of the battery of Comparative example changed. The battery according to Example 1 had an approximately 7% deeper depth of charge in comparison to the battery according to Comparative example, which means that lithium plating was suppressed.

Capacity Measurement

Figure 9:
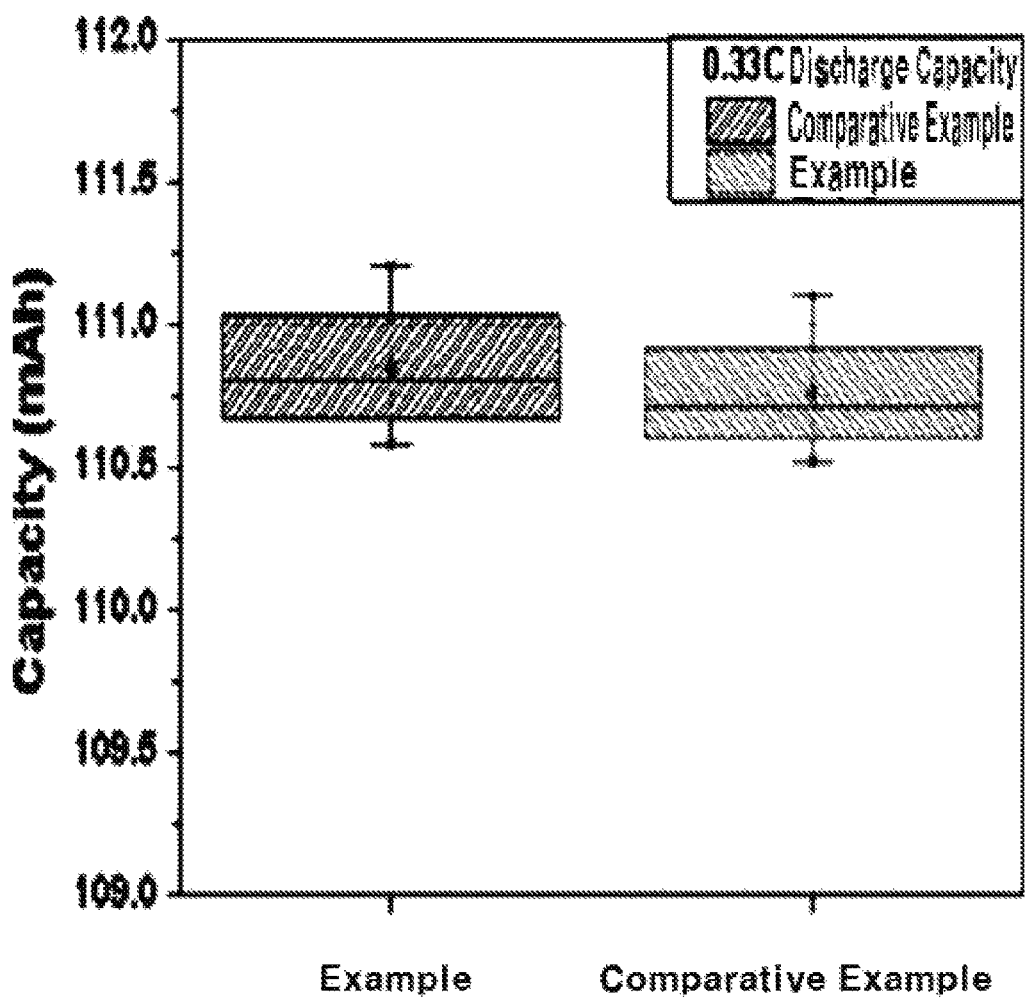
FIG. 9 is a result of measuring capacities of the batteries of Example 1 and Comparative example.

FIG. 9 shows a result of measuring capacities of the batteries of Example 1 and Comparative example. According to FIG. 9, the battery of Example 1 appeared to have nearly no lost capacity when compared with the battery of Comparative example.

Observation of Lithium Precipitation

The batteries of Examples 1 to 3 and Comparative example were charged/discharged for 100 cycles under a condition of 0.3 C discharge/1 C charge within a drive voltage range of 4.1 to 2.5V, and then the batteries were disassembled to determine whether lithium was precipitated on the electrode through visually observation, and the results are shown in Table 1.

TABLE 1

|  | Example 1 | Example 2 | Example 3 | Comparative Example |
|---|---|---|---|---|
| Lithium Precipitation | X | X | X | O |

As described above, the electrode for a secondary battery of the present disclosure has nearly no loss of capacity when compared to a conventional electrode having no fine holes and allows the occurrence of the lithium plating phenomenon to be prevented despite a high loading amount of the electrode mixture layer, thereby allowing electrical performance deterioration of the electrode to be prevented.

The invention claimed is:

1. An electrode for a secondary battery comprising: an electrode mixture layer including an electrode active material on one surface or both surfaces of a current collector, wherein the electrode mixture layer includes a plurality of fine holes recessed toward the current collector from a vertical cross-sectional surface thereof, and each of the fine holes is a horn-shaped hole whose diameter is linearly decreased from the vertical cross-sectional surface to an inner end part having a circular arc shape.

2. The electrode of claim 1, wherein the fine holes are formed in an electrode mixture layer having a loading amount of about 3.5 to 5.5 mAh/cm2 and a porosity of about 25 to 35%.

3. The electrode of claim 1, wherein a depth of each of the fine holes formed from the vertical cross-sectional surface toward the current collector is about 80 to 90% of a thickness of the electrode mixture layer corresponding thereto.

4. The electrode of claim 1, wherein the fine holes have the shape of a triangle, a quadrangle, a pentagon, a hexagon, a circle, a semicircle, or an ellipse on a plane on a surface part of the electrode mixture layer.

5. The electrode of claim 1, wherein the fine holes have an average diameter of about 100 to 200 micrometers at the vertical cross-sectional surface, and have an average diameter of about 20 to 50 micrometers at an inner end part thereof.

6. The electrode of claim 1, wherein the fine holes have a regular array structure on a plane on a surface part of the electrode mixture layer.

7. The electrode of claim 1, wherein the fine holes have a structure in which a diameter is continuously or discontinuously decreased from the vertical cross-sectional surface toward the current collector.

8. A device for manufacturing the electrode for a secondary battery according to claim 1, comprising: a fine hole forming mold, wherein the fine hole forming mold has a structure in which horn-shaped protrusions corresponding to fine holes protrude from one surface thereof so that, when the one surface is pressed against a surface of an electrode mixture layer, horn-shaped fine holes recessed from a surface part of the electrode mixture layer toward a current collector are formed.

9. A device for manufacturing the electrode for a secondary battery according to claim 1, comprising: a fine hole forming roller, wherein the fine hole forming roller has a structure in which horn-shaped protrusions corresponding to fine holes protrude from an outer surface thereof so that, when the outer surface is pressed against a surface of an electrode mixture layer, horn-shaped fine holes recessed from a surface part of the electrode mixture layer toward a current collector are formed.

10. The device of claim 8, wherein the horn-shaped protrusions have an average diameter of about 100 to 200 micrometers at an end part having a relatively large diameter, and an average diameter of about 20 to 50 micrometers at an end part having a relatively small diameter in a vertical cross-sectional surface thereof.

11. The device of claim 9, wherein the horn-shaped protrusions have an average diameter of about 100 to 200 micrometers at an end part having a relatively large diameter, and an average diameter of about 20 to 50 micrometers at an end part having a relatively small diameter in a vertical cross-sectional surface thereof.

12. A method of manufacturing the electrode for a secondary battery according to claim 1, comprising: coating an electrode mixture slurry including an electrode active material on a current collector; drying and rolling the current collector coated with the electrode mixture slurry to form an electrode mixture layer; and forming a plurality of horn-shaped fine holes recessed into the electrode mixture layer by pressing a mold or a roller against a surface of the electrode mixture layer.

13. The method of claim 12, wherein the electrode mixture layer formed in the above process has a loading amount of about 3.5 to 5.5 mAh/cm2 and a porosity of about 25 to 35%.

14. The method of claim 12, wherein the mold or the roller includes fine hole forming protrusions in a shape corresponding to the horn-shaped fine holes at a part facing the surface of the dried and rolled electrode mixture layer.

15. The method of claim 14, wherein each of the horn-shaped protrusions has an average diameter of about 100 to 200 micrometers at an end part thereof having a relatively large diameter, and an average diameter of about 20 to 50 micrometers at an end part having a relatively small diameter in a vertical cross-sectional surface thereof.

* * * * *